(12) United States Patent
Park

(10) Patent No.: US 7,607,686 B2
(45) Date of Patent: Oct. 27, 2009

(54) CURTAIN AIR BAG DEVICE FOR VEHICLE

(75) Inventor: Sung-Yong Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 333 days.

(21) Appl. No.: 11/647,718

(22) Filed: Dec. 28, 2006

(65) Prior Publication Data

US 2008/0111352 A1    May 15, 2008

(30) Foreign Application Priority Data

Nov. 13, 2006    (KR)    ...... 10-2006-0111534

(51) Int. Cl.
*B60R 21/20* (2006.01)
*B60R 21/21* (2006.01)

(52) U.S. Cl. .................. 280/730.2; 280/728.2

(58) Field of Classification Search ....... 280/730.1, 280/730.2, 749, 728.2, 731
See application file for complete search history.

(56) References Cited

U.S. PATENT DOCUMENTS

| | | | |
|---|---|---|---|
| 6,363,307 B1 * | 3/2002 | Ikegami | 701/45 |
| 6,695,341 B2 * | 2/2004 | Winarto et al. | 280/730.2 |
| 7,000,944 B2 * | 2/2006 | Bakhsh et al. | 280/730.1 |
| 7,172,212 B2 * | 2/2007 | Aoki et al. | 280/730.2 |
| 2005/0140127 A1 * | 6/2005 | Nakajima | 280/731 |
| 2005/0179238 A1 * | 8/2005 | Kippschull et al. | 280/728.2 |

FOREIGN PATENT DOCUMENTS

| | | |
|---|---|---|
| JP | 11-034787 | 2/1999 |
| JP | 2003-341463 | 12/2003 |

* cited by examiner

*Primary Examiner*—Paul N Dickson
*Assistant Examiner*—Nicole Verley
(74) *Attorney, Agent, or Firm*—Edwards Angell Palmer & Dodge LLP; Peter F. Corless

(57) ABSTRACT

The present invention provides a curtain air bag device for vehicle that can protect passengers with different heights by automatically shifting unfolded-positions of an air bag cushion of a curtain air bag in accordance with passenger heights.

6 Claims, 3 Drawing Sheets

CURTAIN AIR BAG DEVICE FOR VEHICLE

CROSS-REFERENCE TO RELATED APPLICATIONS

The present application claims priority from Korean Patent Application Serial Number 10-2006-0111534 filed with the Korean Intellectual Property Office on Nov. 13, 2006, the disclosure of which is hereby incorporated by reference herein in its entirety.

FIELD OF THE INVENTION

The present invention relates to a curtain air bag device for vehicle, and more particularly to a curtain air bag that can protect passengers with various heights.

BACKGROUND OF THE INVENTION

Curtain air bags are designed to primarily protect passenger head by an air bag cushion expanded by the gas exerted by an explosion of an inflator in the event of side collision.

Different passengers have different physical characteristics, including height. Particularly, there is a significant height difference between children and adults. As a result, in order to protect the heads of children, it is required to increase the length downward of an air bag cushion to unfold down.

However, as the length of an air bag cushion increases, the volume of a curtain air bag largely increases downward. This makes it difficult to mount a curtain air bag in a narrow space between the chassis and the head lining.

There is thus a need for an improved curtain air bag device that can protect passengers with different heights by automatically shifting unfolded-positions of an air bag cushion of a curtain air bag in accordance with passenger heights.

SUMMARY OF THE INVENTION

In one aspect, the present invention provides a curtain air bag device for vehicle comprising: at least one sensor mounted to detect a passenger head position; an air bag cushion; an inflator connected with the air bag cushion; height-adjusting means connected with the upper end of the air bag cushion to change the height of the upper end of the air bag cushion; and a controller receiving signals from the sensor and actuating the height-adjusting means before the air bag cushion unfolds.

In a preferred embodiment, the height-adjusting means includes a motor controlled by the controller; a rotating bar connected to the motor; and a plurality of tethers each of which has one end fixed to the rotating bar and the other end fixed to the upper end of the air cushion bag.

In such embodiment, the rotating bar is mounted inside a stopper box, and each of the tethers passes through the downside of the stopper box and connects the rotating bar with the upper end of the air bag cushion.

In another preferred embodiment, the present device may further comprise a gas guide that is extendible between the air bag cushion and the inflator and steadily supplies gas from the inflator into the air bag cushion moving downward.

A preferred example of the sensor in accordance with the present invention includes a supersonic sensor.

In another aspect, the present invention provides a method of protecting passengers with different heights in a vehicle equipped with a curtain air bag device which includes an air bag cushion; a rotating bar; and tethers each of which has one end fixed to the rotating bar and the other end fixed to the upper end of the air cushion bag, comprising the steps of: (a) detecting the height of a passenger; (b) unrolling the tethers out of the rotating bar in a predetermined amount according to the detected height; and (c) adjusting the height of the air bag cushion in response to the unrolling amount of the tether.

In a further aspect, motor vehicles are provided that comprise a described curtain air bag device.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present curtain air bag devices will be particularly useful with a wide variety of motor vehicles.

Other aspects of the invention are discussed infra.

BRIEF DESCRIPTION OF THE DRAWINGS

For a better understanding of the nature and objects of the present invention, reference should be made to the following detailed description with the accompanying drawings, in which.

DETAILED DESCRIPTION

Figure 1:
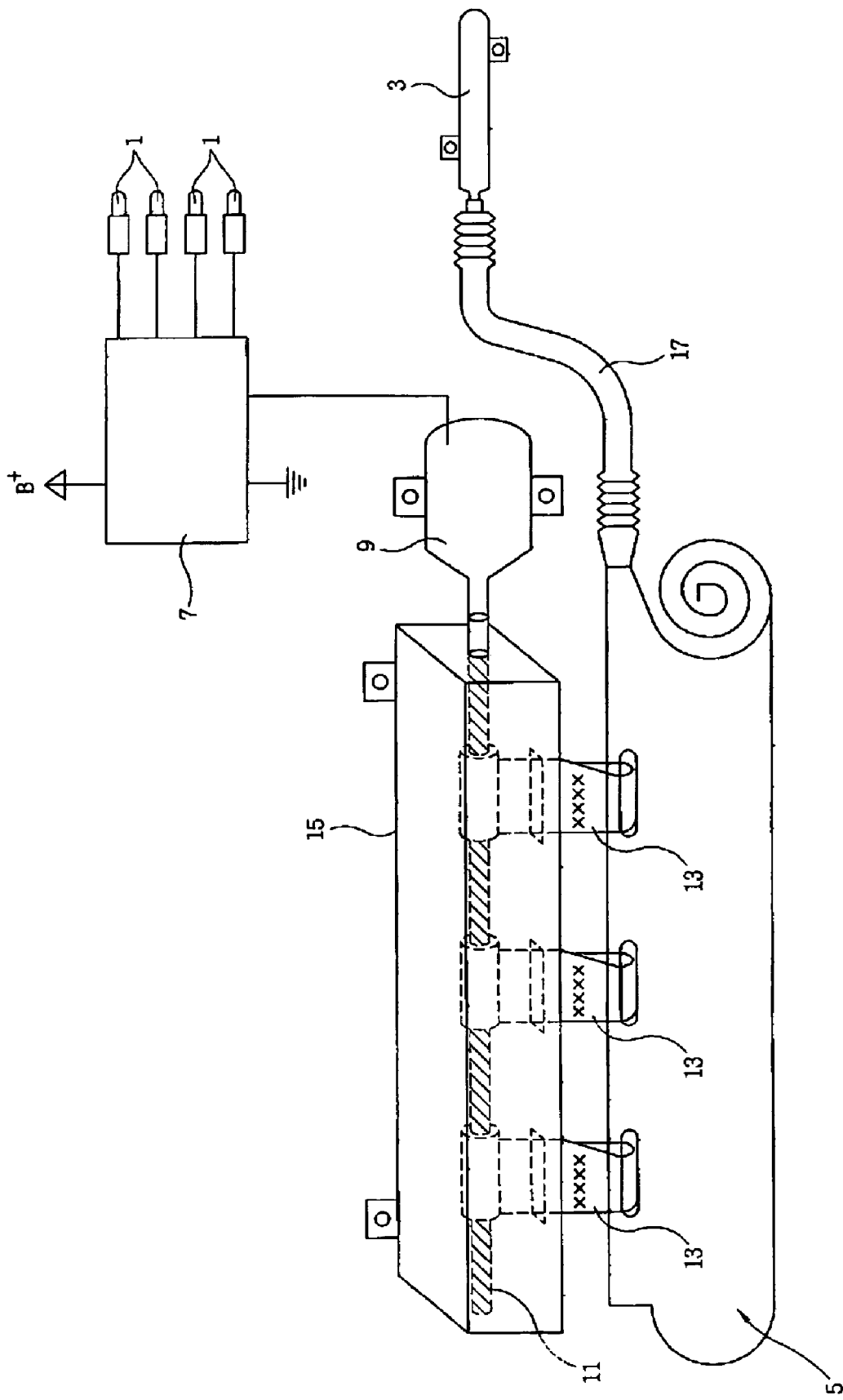
FIG. 1 is a view illustrating a curtain air bag device for vehicle according to an embodiment of the invention.

Referring to FIG. 1, a curtain air bag device according to an embodiment of the invention includes: at least one sensor 1 provided to detect positions of the heads of passengers; an air bag cushion 5 connected with an inflator 3; a height-adjusting means connected with the upper end of air bag cushion 5 to change the height of the upper end of air bag cushion 5; and a controller 7 receiving signals from sensors 1 and actuating the height-adjusting means before air bag cushion 5 unfolds.

The height-adjusting means according to the embodiment includes a motor 9 that is fixed to a chassis and controlled by controller 7, a rotating bar 11 connected to motor 9, and a plurality of tethers 13, each of which has an end fixed to rotating bar 11 and the other end fixed to the upper end of air cushion bag 5.

Rotating bar 11 is mounted inside a stopper box 15 fixed to the chassis to be securely and rotatably supported and each of the tethers 13 passes through the downside of stopper box 15 and connects rotating bar 11 with the upper end of air bag cushion 5.

Preferably, a gas guide 17 may be provided. It is extendible between air bag cushion 5 and inflator 3 and steadily supplies gas from inflator 3 into air bag cushion 5 moving downward.

Gas guide 17 is made of a flexible material and has bellows as shown in FIG. 1. Accordingly, gas guide 17 is capable of steadily supplying gas generated from inflator 3 into air bag cushion 5, even though inflator 3 is firmly fixed to the chassis and air bag cushion 5 unfolds down and moves relative to inflator 3.

A supersonic sensor may be used as the sensor 1 that detects the head position of a passenger. Preferably, supersonic sensors may be mounted to the head lining and detect the height of the passenger in each seat by measuring the highest positions of the passengers.

Figure 2:
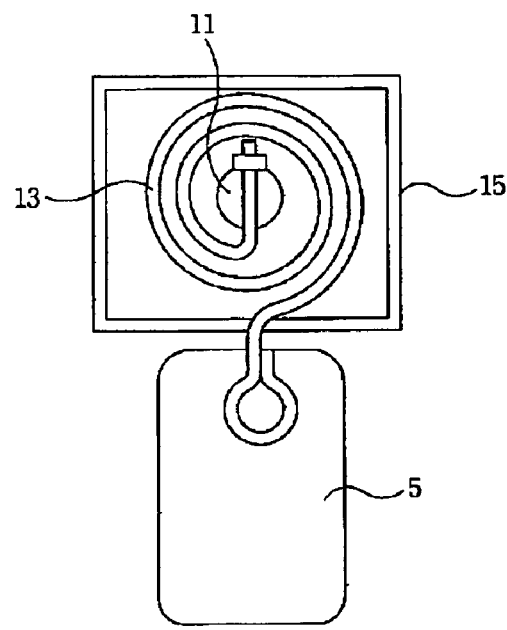
FIGS. 2 to 4 are views illustrating the operation of the curtain air bag device of FIG. 1 in order.
Figure 3:
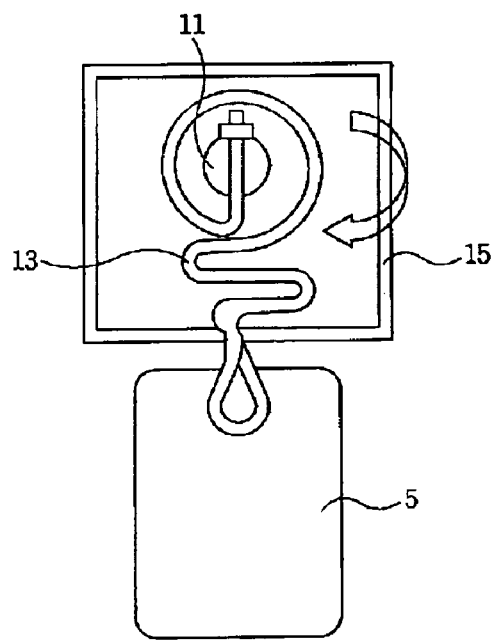
Figure 4:
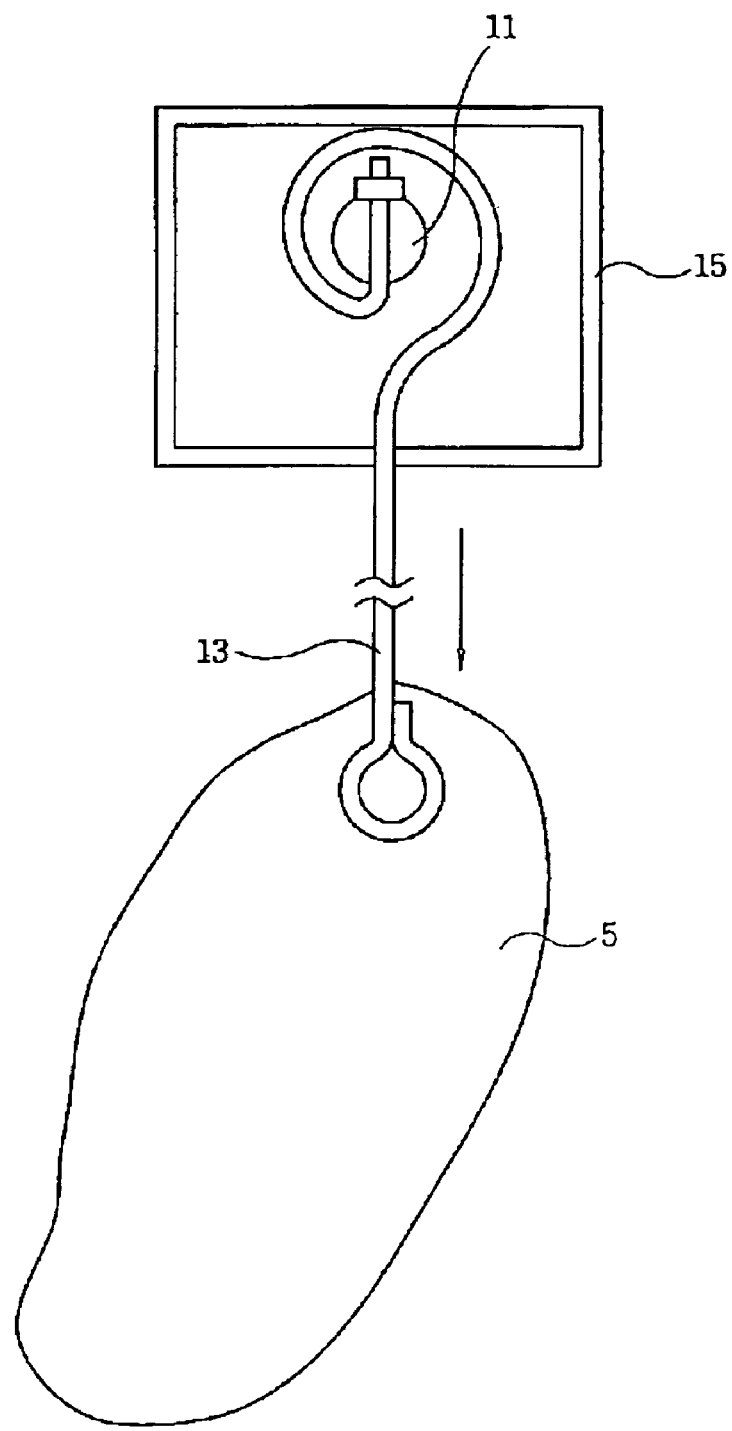

The operation of the curtain air bag device for vehicle having the above configuration is described hereafter with reference to FIGS. 2 to 4.

FIG. 2 shows an initial condition of the curtain air bag with the air bag cushion mounted, and is a vertical cross-sectional view of FIG. 1.

As described above, stopper box 15 is disposed between the chassis and the head lining and one of its sides is fixed to the chassis, air bag cushion 5 is connected with inflator 3 through gas guide 17, and each of tethers 13 is rolled around rotating bar 11, so that the upper end of air bag cushion 5 is held at the highest position as long as rotating bar 11 does not rotate.

When a passenger gets into a vehicle, controller 7 detects passenger head position by using sensor 1.

After the detection, controller 7 actuates motor 9 and rotating bar 11 rotates accordingly, and tether 13 is unrolled out of rotating bar 11 to the position corresponding to the height as shown in FIG. 3.

Data about how much tether 13 is unrolled and how much the upper end of air bag cushion 5 lowers can be obtained from experiments. The data are inputted in controller 7 in advance, and the rotational amount of motor 9 can be controlled according to the height of the passenger's head detected by sensor 1.

While a vehicle travels, if the curtain air bag happens to unfold downward under the conditions described above, the gas generated from inflator 3 is supplied to air bag cushion 5 and fills the inside of air bag cushion 5.

As the gas fills the inside, air bag cushion 5 moves downward by the force of the gas as shown in FIG. 4, and a limit to the movement depends on the unrolled length of tether 13.

In more detail, for a short passenger such as children, because a large amount of tether 13 is already unrolled, while air bag cushion 5 unfolds down, entire air bag cushion 5 moves downward within a length that tether 13 allows, so that it can protect the exact head of the short passenger.

On the other hand, for a tall passenger, controller 7 may allow tether 13 to be unrolled very little.

Further, when passengers are changed or the vehicle engine starts or stops, controller 7 activates motor 9 to move tether 13 to the initial position, that is, a position with maximum rolling amount, as shown in FIG. 2, and then may be programmed such that it may adjust the position of a new passengers' head by actuating motor 9.

According to the embodiment of the invention, it is possible to provide the most suitable protection for all passengers with different heights by automatically changing the unfolded positions of an air bag cushion of a curtain air bag according to the heights.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A curtain air bag device for vehicle comprising:
    at least one sensor mounted to detect a passenger head position;
    an air bag cushion;
    an inflator connected with the air bag cushion;
    height-adjusting means connected with the upper end of the air bag cushion to change the height of the upper end of the air bag cushion; and
    a controller receiving signals from the sensor and actuating the height-adjusting means before the air bag cushion unfolds,
    wherein the height-adjusting means comprises:
    a motor controlled by the controller;
    a rotating bar connected to the motor; and
    a plurality of tethers each of which has one end fixed to the rotating bar and the other end fixed to the upper end of the air cushion bag.

2. The device as defined in claim 1, wherein the rotating bar is mounted inside a stopper box, and each of the tethers passes through the downside of the stopper box and connects the rotating bar with the upper end of the air bag cushion.

3. The device as defined in claim 1, further comprising:
    a gas guide that is extendible between the air bag cushion and the inflator and steadily supplies gas from the inflator into the air bag cushion moving downward.

4. The device as defined in claim 1, wherein the sensor is a supersonic sensor.

5. A method of protecting passengers with different heights in a vehicle equipped with a curtain air bag device which includes an air bag cushion; a rotating bar; and tethers each of which has one end fixed to the rotating bar and the other end fixed to the upper end of the air cushion bag, comprising the steps of:
    detecting the height of a passenger;
    unrolling the tethers out of the rotating bar in a predetermined amount according to the detected height; and
    adjusting the height of the air bag cushion in response to the unrolling amount of the tether.

6. A motor vehicle comprising the curtain air bag device of claim 1.

* * * * *